3,790,634
PRODUCTION OF AMINES AND DIAMINES
Virgil W. Weiss, Kirkwood, Mo., assignor to Monsanto Company, St. Louis, Mo.
No Drawing. Filed Sept. 2, 1971, Ser. No. 177,490
Int. Cl. C07c 85/04, 85/16
U.S. Cl. 260—583 N   9 Claims

ABSTRACT OF THE DISCLOSURE

Production of amines by:

(1) contacting a halohydrocarbon with a large excess of an ammonium salt and a large excess of ammonia, followed by evaporation of excess ammonia after the formation of amine hydrohalide in the reaction mixture, and
(2) subjecting the said reaction mixture to a temperature below 0° C. with the resultant precipitation of the amine hydrohalide, and
(3) neutralizing the said amine hydrohalide with a base to obtain the free amine.

---

This invention relates to a new method for the production of primary mono and diamines and salts thereof as exemplified by hexamethylenediamine and its salts.

Amines such as hexamethylenediamine are valuable chemical intermediates used for example, in the synthesis of polyamides and polyester amides. Several commercial processes for the production of hexamethylenediamine have been described. One of the methods described in the prior art consists of aminating 1,6-dihaloalkanes.

The reaction between ammonia and alkyl halides to give amines has been known for many years but has not been considered as a practical method for the production of primary amines because of the low selectivity. One method of improving the selectivity of the ammonolysis reaction is to include ammonium salts as inhibitors of subsequent reactions of the organic amines. This is taught in U.S. Pat. No. 3,422,145. The disadvantage of this technique, as taught heretofore, is that both the amine salt and the ammonium salt have to be neutralized by base before the free amine can be recovered. The expense of the extra caustic required for the ammonium salt and the low yield of amine (plus halide recovery in a continuous process) makes such a process economically unattractive.

It is an object of this invention to provide a process for the ammonolysis of halo compounds such as dihalohexanes and recovery of the reaction products which overcomes the above-mentioned disadvantages.

It is a further object of this invention to give a much higher selectivity than has heretofore been possible in the reaction of haloalkanes with ammonia. It is a further object to provide a process which does not require the evaporation of large quantities of ammonia after the completion of the reaction.

It is another advantage of the present invention to provide a low temperature crystallization technique which avoids the use of extraneous components.

It is a further object of this invention to provide a process for the ammonolysis of dihalohexanes which can be conducted at much lower pressures than heretofore possible.

In accordance with the present invention, a feed component comprising a halogenated hydrocarbon such as a dihalide, e.g., a dihalohexane is reacted with an excess of ammonia and an excess of ammonium halide with all of the reaction components present in one or more liquid phases. After the reaction to produce the amine salt is complete, the ammonia may be evaporated or the total reaction mixture may be cooled sufficiently below 0° C. to selectively precipitate out the amine salt.

As described in the specific description above, the reaction system for the production of the amine salts comprises ammonia, ammonium salt and a dihalohexane or other halogenated hydrocarbon. Suitable ammonium salts are the halides, acetate, formate and other carboxylic acid salts, nitrate, thiocyanate and other salts which are soluble in liquid ammonia. The preferred salt depends on the dihalohexane being reacted, i.e., for dichlorohexane the preferred salt is ammonium chloride, for dibromohexane the preferred salt is ammonium bromide, etc.

In the practice of the present invention, the halogenated hydrocarbons include mono and dihalogenated alkyl and aryl compounds having from 1 to 25 carbon atoms. Examples include chloromethane, allyl chloride, n-bromobutane, 1,6-dibromohexane, 1,8-dibromooctane, 1-chlorododecane, chlorobenzene, iodobenzene, 2-chlorodidecane, and benzyl chloride.

The reaction is typically carried out with the ratios of the reactants as follows: 1 mol of the halogenated hydrocarbon, e.g., dihalohexane to at least 30 mols ((preferably 30 to 75) of ammonium salt and at least 40 (preferably 40 to 300) mols of ammonia. It is found to be advantageous to add the dihalohexane to the mixture of ammonia and ammonium halide slowly. The preferred reaction temperature range is 20° C.–120° C. which requires pressures in the general range of 20 to 500 p.s.i.g. Such pressures are considerably lower than are found to result when the ammonium salt is not present.

Several unexpected advantages accrue from carrying out the reaction with a ratio of reactants as described above, namely a substantial increase in the selectivity to hexamethylenediamine and a substantial reduction in the pressure of the reaction compared with processes described in the prior art.

The present invention in one aspect embodies a selective precipitation procedure in an ammonia solvent solution, to separate the organic amines such as hexamethylenediamine, and hexamethylenediamine dihydrohalide salt, relative to the inorganic salts such as ammonium bromide, ammonium nitrate, etc. It has been found that a result is obtained which is contrary to the expected precipitation of inorganic salts. The reaction solutions as described herein, when subjected to cooling. e.g., to a temperature below 0° C., and preferably at a temperature of −5° C. to −50° C., yield a quite efficient selective precipitation of the organic amine compounds, for example, hexamethylenediamine and hexamethylenediamine hydrohalide salts. The inorganic salts such as ammonium bromide remain substantially in solution. The cooling to the aforesaid temperature ranges may be accomplished by the use of a tank or other vessel provided with cooling coils within which a refrigerant such as ammonia is evaporated, or the cooling may also be accomplished by evaporating ammonia from the surface of the ammonia solution employed in the present process.

After the precipitation of the amines and amine salts, e.g., hexamethylenediamine and hexamethylenediamine dihydrobromide salts, the amines thus removed can be washed in order to remove absorbed minor proportions of inorganic salts. Such washing or contacting is preferably conducted by application of liquid ammonia proportioned to the weight of amine salts and ammonium salts, e.g., ammonia, in at least 50 wt. percent proportion, or broadly from 50 wt. percent to 500 wt. percent at a temperature below 0° C., or preferably at temperatures from −5° C. to −50° C. In this way the minor residual adsorbed inorganic ammonium salts are removed from the desired products, e.g., hexamethylenediamine and hexamethylenediamine hydrohalide salts.

The following examples further illustrate the application of novel amination reaction and separation process as applied to the amination of 1,6-dibromohexane. However, the invention is not limited thereto.

EXAMPLE 1

Thirty four gm. of anhydrous ammonia and 39.4 gm. of ammonium bromide are charge to a steel autoclave (300 ml.) equipped with a Magne-dash stirrer. The temperature is raised to 50° C. and stirring commenced. A charge of 2.44 gm. of 1,6-dibromohexane is added over a period of 3 hours during which time the pressure in the system remains at less than 100 p.s.i.g. The weights of the reaction components represent ratios of 20 mols ammonia and 40 mols ammonium bromide to 1 mol of 1,6-dibromohexane. The reaction is continued for a further 30 minutes following completion of the addition of dibromohexane. Subsequently the reaction mixture is cooled to —30° C. whereupon the hexamethylenediamine and hexamethylenediamine dihydrobromide salt is precipitated and filtered off. (In a similar experiment at 0° C., no precipitation occurs.) The filtered product is washed with 5 grams of liquid ammonia at —30° C. which serves to remove residual ammonium halides, and to neutralize the amine salt, leaving essentially pure amine product which analysis shows to contain about 94% hexamethylenediamine.

EXAMPLE 2

This example when compared with Example 1 illustrates the advantages of conducting the reaction as in Example 1 with much higher concentrations of ammonium salt than heretofore thought practical.

The reaction is carried out as described in Example 1 except instead of 39.4 gm. of ammonium bromide, 19.7 gm. is used with the same amount of the dibromohexane in the reaction mixture. After cooling and precipitation the selectivity to hexamethylenediamine is found to be 79%. In comparison, the method of the present invention as shown in Example 1, gives a selectivity of 94%.

EXAMPLE 3

The effectiveness of the aforesaid concentrations of ammonium salts is also shown with ammonium nitrate. The table below illustrates the resulting yield of hexamethylenediamine when employing various proportions of originally charged-in mol ratios of ammonium nitrate, ammonia and 1,6-dibromohexane (designated as DBH) in the production of hexamethylenediamine, under the same general conditions of Example 1.

| Charged in, mol ratios | | Amine yield based on DBH |
|---|---|---|
| $NH_4NO_3$ | $NH_3$/DBH | |
| 15.1/1 | 100/1 | 76 |
| 41.75/1 | 100/1 | 95 |

EXAMPLE 4

Seventeen gm. of anhydrous ammonia and 16.0 gm. of ammonium chloride are charged to a steel autoclave (300 ml.) equipped with a Magne-dash stirrer. The temperature is raised to 100° C. and stirring commenced. A charge of 2.0 gm. of 1-chlorododecane is added over 3 hours. The reaction is continued for 6 hours after completion of the addition. Subsequently the reaction mixture is cooled to —30° C. whereupon the dodecylamine and dodecylamine hydrochloride salt is precipitated and filtered off. (In a similar experiment at 0° C., no precipitation occurs.) The filtered product is washed with 5 grams of liquid ammonia at —30° C. which serves to remove residual ammonium halides, and to neutralize the amine salt, leaving essentially pure amine product as dodecylamine.

What is claimed is:

1. A process for the production of amines and amine hydrohalide salts having from 1 to 25 carbon atoms which comprises admixing a halogenated alkyl compound having from 1 to 25 carbon atoms, with ammonia in the presence of an excess of ammonium salt, the ammonia being present in the solution at a concentration of at least 40 mols for each mol of the said alkyl compound, and with the ammonium salt being present to the extent of at least 30 mols for each mol of the said alkyl compound, thereby forming the said amines and amine hydrohalide salts, and thereafter subjecting the said solution to a temperature of —5° C. to —50° C., and precipitating the said amine and amine salts while the inorganic salts are substantially retained in the said solution.

2. A process as in claim 1 in which the ammonium salt is ammonium bromide.

3. A process as in claim 1 in which the said halogenated alkyl compound is 1,6-dibromohexane, and the said ammonium salt is ammonium bromide.

4. A process as in claim 1 in which the process is carried out within the temperature range of 20° C. to 120° C. and at pressures of 20 to 500 p.s.i.g.

5. A process as in claim 1 in which a solution comprising hexamethylenediamine and hexamethylenediamine salts and inorganic ammonium salts is cooled whereupon the hexamethylenediamine and the hexamethylenediamine salts are selectively precipitated while the inorganic salts are substantially retained in the said solution.

6. A process as in claim 5 in which the ammonium salt is ammonium bromide and the hexamethylenediamine salt is hexamethylenediamine-dihydrobromide.

7. A process in which an amination mixture comprising hexamethylenediamine-dihydrohalide salt and an inorganic ammonium salt, is contacted with liquid ammonia at a temperature below 0° C. to remove the said inorganic ammonium salt from the hexamethylenediamine-dihydrohalide salt.

8. A process as in claim 1 in which the said halogenated alkyl compound is chlorododecane and the amino product is dodecylamine.

9. A process for the production of amines having from 1 to 25 carbon atoms which comprises admixing a halogenated alkyl compound having from 1 to 25 carbon atoms, with ammonia in the presence of an excess of ammonium salt, the ammonia being present at a concentration of at least 40 mols for each mol of the said alkyl compound, and with the ammonium salt being present to the extent of at least 30 mols for each mol of the said alkyl compound, thereby forming the said amines and amine hydrohalide salts, evaporating excess ammonia from the said reaction mixture, and thereafter precipitating the amine hydrohalide by subjecting the said reaction mixture to a temperature below 0° C., separating the amine hydrohalide and neutralizing the same with a base to obtain the free amine.

References Cited

UNITED STATES PATENTS 3,422,145   1/1969   Steinmetz _____ 260—585 A

LEWIS GOTTS, Primary Examiner

R. L. RAYMOND, Assistant Examiner

U.S. Cl. X.R.

260—570.9, 583 R, 583 H, 583 P, 585 A

PO-1050
(5/69)

UNITED STATES PATENT OFFICE
CERTIFICATE OF CORRECTION

Patent No. 3,790,634                     Dated Feb. 5, 1974

Inventor(s) Virgil W. Weiss

It is certified that error appears in the above-identified patent and that said Letters Patent are hereby corrected as shown below:

Column 3, line 14, "20 mols", should read --200 mols--

Column 3, line 53, in the tabulation, Column 1 should read --$NH_4NO_3$/DBH--

Signed and sealed this 18th day of June 1974.

(SEAL)
Attest:

EDWARD M. FLETCHER, JR.
Attesting Officer

C. MARSHALL DANN
Commissioner of Patents